United States Patent [19]

Banner

[11] Patent Number: 5,057,661
[45] Date of Patent: Oct. 15, 1991

[54] PROCESS FOR TERMINATING INSULATED CONDUCTOR WIRES

[75] Inventor: Alvin C. Banner, Montgomery County, Ohio

[73] Assignee: Globe Products Inc., Huber Heights, Ohio

[21] Appl. No.: 428,057

[22] Filed: Oct. 26, 1989

[51] Int. Cl.$^5$ .............................................. B23K 11/00
[52] U.S. Cl. ................................ 219/56.22; 219/56.1; 219/121.69
[58] Field of Search ................. 219/56.1, 56.22, 56.21, 219/121.68, 121.69

[56] References Cited

U.S. PATENT DOCUMENTS

| | | | |
|---|---|---|---|
| 2,807,705 | 9/1957 | Arrain | 219/56.1 |
| 3,045,103 | 7/1962 | Warner . | |
| 3,156,037 | 11/1964 | Warner et al. . | |
| 3,610,874 | 10/1971 | Gagliano | 219/121 L |
| 3,781,981 | 1/1974 | Miura et al. | 29/597 |
| 4,034,152 | 7/1977 | Warner . | |
| 4,329,564 | 5/1982 | Hazelton et al. | 219/121.69 |
| 4,371,772 | 1/1983 | Szantho et al. . | |
| 4,687,898 | 8/1987 | Riordan et al. . | |
| 4,687,900 | 8/1987 | Warner | 219/56.22 |
| 4,761,535 | 8/1988 | Lawson | 219/121.68 |
| 4,849,596 | 7/1989 | Riordan et al. . | |

FOREIGN PATENT DOCUMENTS 3542380 9/1988 Fed. Rep. of Germany .......... 39/32

OTHER PUBLICATIONS

Translation of decision dated Dec. 19, 1990, revoking German Patent 35 42 380.
H. Maul, Article in magazine "Feinwerktechnik & Messetechnik", 92 (1984)7 titled Mikroschweissen von Feinstdrahten mit dem Laserstrahl, pp. 363–366.
H. Weissmantel, Article in "Feinwerktechnik & Messetechnik", 90 (1982)5, Das Schweissen von Kupfer mit dem Laserstrahl, pp. 239–241.

*Primary Examiner*—Clifford C. Shaw
*Attorney, Agent, or Firm*—Roger S. Dybvig

[57] ABSTRACT

The insulating coating on the portion of a conductor wire to be fused to a terminal is evaporated prior to the fusing operation by the use of a focused inductive heater, such as an ultrasonic or laser beam, focused on the portion of the wire from which the insulating coating is to be removed. Following removal of the insulating coating in this manner, the terminal and the conductor wire are fused together by application of heat and pressure thereto. The invention is described for use in connecting armature coil lead wires to commutators having bars with tangs.

8 Claims, 1 Drawing Sheet

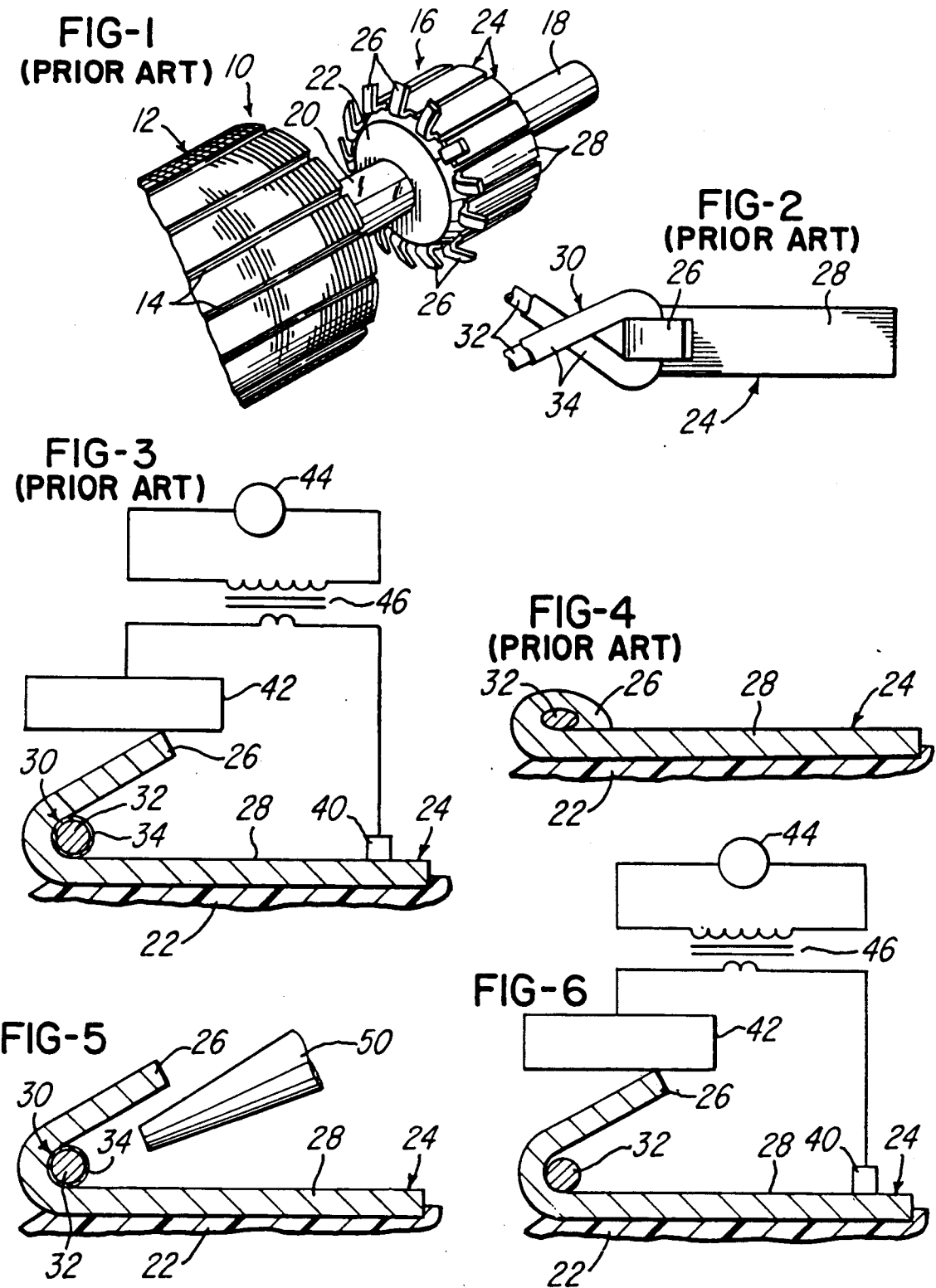

PROCESS FOR TERMINATING INSULATED CONDUCTOR WIRES

SUMMARY OF THE INVENTION

This invention relates to a process for terminating insulated conductor wires, and particularly to a process for terminating an insulated conductor wire to a terminal wherein the temperature of evaporation of the insulating coating is close to or higher than the softening temperature of the conductive material from which the terminal is made. Aspects of this invention involve specifically the termination of coil leads to terminal bars having lead receiving hooks or tangs, such as the bars of commutators of armatures for fractional horsepower electric motors, but aspects of this invention may have broader application.

Armatures for fractional horsepower electric motors have coils of insulated wire wound in an armature core with connecting wire portions, which are called coil leads herein, between coils that extend over lead-receiving tangs of a cylindrical array of commutator bars lodged in circumferentially-spaced, bar-receiving pockets in a molded plastic commutator body. It is now common to use an electric resistance fusing machine for fusing the coil leads to the commutator tangs. Such a fusing machine applies heat and pressure sufficient to flash evaporate the insulating coating along the portion of the coil lead to be connected to the tang, soften the metal that forms parts of the body of the commutator bar and its tang, and bend the commutator tang into engagement with softened portions of the commutator bar body over the coil lead portion from which the insulation has been evaporated. Fusing apparatus specifically for this purpose is available from Joyal Products, Inc. of Linden, N.J., and The Black & Webster Company of Waltham, Mass. U.S. Pat. Nos. 3,045,103 and 4,371,772 disclose examples of fusing machines of this type.

When the temperature required to evaporate the insulating coating on the wire is close to or in excess of the softening temperature of the commutator bar metal, experience has shown that an inferior armature may be produced using standard fusion techniques. The fusing electrodes are applied respectively to the commutator tang and to a portion of the body of the commutator bar somewhat remote from the tang. Sufficient heat energy must be applied by one or both of the electrodes, and the current flowing between the electrodes through the commutator bar, to heat the body of the commutator bar and its tang to bring the insulating coating on the coil lead to its evaporation temperature. This may require more energy than needed to soften the commutator bar metal sufficiently for fusion to occur in which event portions of the commutator bar and the coil lead may become plastic or molten. The application of such high heat energy may produce localized, uneven annealing of the commutator bar metal and may also partly or completely destroy the bond between the commutator bar metal and the underlying plastic body of the commutator. After fusion takes place, the commutator is usually turned to a final form by a turning lathe. Uneven annealing of the commutator bars may interfere with the turning operations and may lead to further loosening of the commutator bars from the underlying plastic body of the commutator. The application of excess heat energy may also result in the coil lead being broken or so reduced in cross section that it does not provide good electrical contact and that it may easily be broken during subsequent processing or use of the armature.

An object of this invention is to provide an improved process for terminating insulated conductor wires and particularly conductor wires having insulating coatings with high temperatures of evaporation. A more specific object of this invention is to provide an improved method for terminating insulated coil leads to commutator bars of armatures for fractional horsepower electric motors.

A further object of this invention is to provide an improved process for terminating insulated conductor wires and particularly conductor wires having insulating coatings with high temperatures of evaporation to terminals having lead-receiving hooks or tangs. Another more specific object of this invention is to provide an improved method for terminating insulated coil leads to coil lead-receiving tangs of commutator bars of armatures for fractional horsepower electric motors.

Further objects of this invention include the provision of improved processes for connecting conductor wires such as coil leads to terminals such as commutator bars having tangs capable of being carried out at a high rate of speed suitable for modern mass production which may be carried out fully automatically and to provide such processes which are relatively simple and inexpensive to practice. More particularly, a further object of this invention is to provide such a process which may effect a savings and the energy required to fuse conductor wires to terminals.

In accordance with this invention, the insulating coating on the portion of a terminal wire to be fused to a terminal is melted or evaporated prior to the fusing operation by the use of a focused beam-type inductive heater, such as an ultrasonic or laser beam, having a beam exit nozzle focused on the portion of the wire from which the insulating coating is removed. Following removal of the insulating coating in this manner, the terminal and the lead wire are fused together by application of heat and pressure thereto.

In the practice of this invention for the permanent connection of coil leads to commutators of armatures for electric motors, each coil lead is engaged with the lead-receiving portion of a commutator bar before the beam is focused on the section of the lead from which the insulating coating is to be removed. The armature may be incrementally rotated to position successive coil leads in the path of the beam so that the insulating coatings may be removed from all of the coil leads before the fusing operations take place. The step of removing the insulating coating may be accomplished at a manufacturing station located between an armature winding machine and a fusing machine but could be carried out at the fusing machine. Optionally, with the beam nozzle located at the fusing station so that the insulating coating may be removed from one coil lead which is then immediately fused to its associated commutator bar, the other coil leads and bars being successively treated in the same manner.

Because the relatively high heat energy required to evaporate or completely evaporate the insulating coating is a focused beam which may be directed to a very small portion of the entire terminal area and is required to heat only a very small portion of the conductor wire, a substantial savings in the total energy required to complete a fusing operation may be obtained.

Other objects and advantages will become apparent from the following description and the drawing.

BRIEF DESCRIPTION OF THE DRAWING

FIG. 1 is a fragmentary perspective view of a prior art unwound armature assembly of a type with which this invention may advantageously be used.

FIG. 2 is a fragmentary plan view showing part of the armature assembly of FIG. 1 with a coil lead looped about a commutator tang.

FIG. 3 is a cross sectional view of a portion of a commutator with a coil lead engaged thereby and includes a schematic representation of electrodes and a power supply used in a prior art fusing process.

FIG. 4 is a cross-sectional view of a terminal connection formed by the coil lead and parts of the commutator shown in FIG. 3 after the fusing process has been completed.

FIG. 5 shows a cross-sectional view of the same parts of the commutator as shown in FIG. 3 in readiness to have the coil lead and the commutator bar fused together and illustrates a fragment of an ultrasonic or laser nozzle positioned to cause evaporation of a portion of the insulating coating around the coil lead.

FIG. 6 illustrates the second stage of a process in accordance with this invention and is similar to FIG. 3 except that the insulating coating has previously been removed, by the step illustrated in FIG. 5, from the section of the wire to be fused to the commutator.

DETAILED DESCRIPTION

This invention is shown in connection with the manufacture of armatures for fractional horsepower electric motors. With reference to FIG. 1, such an armature includes an armature assembly generally designated 10 comprising, as well known, a laminated coil-receiving armature core 12 having slots 14 into which coils of wire will be wound and a commutator, generally designated 16, mounted in alignment with the core 12 on an armature shaft 18. The commutator 16 is shown spaced from the core 12 by an insulating sleeve 20 slipped over the shaft 18. For the sake of simplicity, other insulating pieces, such as liners for the core slots 14, are not illustrated. The armature assembly 10 is "unwound" in the sense that the armature coils (not shown) are yet to be wound into the core slots 14.

The commutator 16 comprises a molded plastic body 22 having a plurality of mutually circumferentially-spaced commutator bars 24 in a cylindrical array lodged in outwardly-facing pockets (not shown) in the plastic body 22. In the embodiment illustrated herein, the commutator bars 24 have upwardly and outwardly extending commutator hooks or tangs 26 on the ends of elongate, rectangular bodies 28 facing the armature core 12. As conventional, the tangs 26 are narrower than the bar bodies 28 and extend at an acute angle with respect thereto to form therewith a generally V-shaped, lead-receiving hook.

During the process of winding the armature, coils of wire, or pairs of coils of wire, are successively wound into the armature core slots 14 and the lead wires between coils are extended through the V-shaped hook formed by the commutator tangs 26 and the commutator bar bodies 28. FIG. 2 shows one such coil lead, generally designated 30 engaged with a commutator tang 26 in accordance with a prior art method. The armature coils and the coil leads may be wound by entirely conventional means. A double flier armature winder generally of the type discussed in Banner U.S. Pat. No. 4,459,742 is a preferred example of such means. During the winding operation, it is now common to provide means for automatically connecting to commutator tangs 26 the start leads for the first coils wound and the finish leads for the last coils wound to the commutator tangs. Various methods have been used for this purpose. Examples are shown in Banner U.S. Pat. Nos. 4.633,577 and 4,827,601. The start and finish leads may be treated the same as the coil leads 30 for purposes of this invention.

The conductor wire 30 typically comprises a core 32 made from solid metal wire, known as magnet wire, having a thin, film-like electrically nonconducting or insulating coating 34. Often the commutator bars 24 are formed from copper and the magnet wire is also copper. However, the core 32 may be either solid or stranded and may be formed of other metals such as brass, gold, silver, aluminum or from various metal alloys. The insulating coating 34 may be made from polyesters, vinyls, nylon, or other suitable material.

Following a common prior art practice shown in FIG. 3, fusion of a coil lead 30 to a commutator bar 24 is accomplished by engaging the body 28 of the commutator bar 24 by a low-resistance electrode 40 and engaging the free end of the tang 26 by a high-resistance electrode 42. The electrodes 40 and 42 are connected to a source of electrical power 44 through a transformer 46 to fuse the parts together. The power source 44 activates the electrodes 40 and 42 so that a current path is completed through the tang 26 and the body of the commutator 24. The electrode 42 heats quickly and, under control of suitable apparatus (not shown), such as the apparatus disclosed in said U.S. Pat. Nos. 3,045,103 and 4,371,772, the electrode is simultaneously driven downwardly to drive the free end of the tang 26 toward the body 28 of the commutator bar 24. This action compresses the tang 26, the body 28, and the insulated coil lead 30 together. As this occurs, heat passes by conduction from the electrode 42 to the tang 26 and then to the commutator bar body 28. Heat is also conducted from the tang 26 and the body 28 to the insulated coil lead 30. The compressed parts are sufficiently heated to burn off or evaporate the insulating coating 34 from the wire core 32 of the coil lead 30 so that a section of the wire core 32 is exposed to direct contact with the commutator tang 26 and the commutator bar body 28.

Preferably, in the practice of the prior art method, the the heat generated by the high-resistance electrode 42, and to a small extent, by the current passing through the commutator bar 24, does not melt the commutator bar 24 or the wire core 32, but merely softens the parts to a degree at which the heated portions of the commutator bar 24 and the wire core 32 lose their memory so that, under the pressure applied by the high-resistance electrode 42, the tang 26, the bar body 28, and the exposed metal core 32 are driven together to expel voids and air spacers and to compress their mutually engaging surfaces into a surface-adhered and compression-bonded joint. The free end of the tang 26 also fuses to the confronting parts of the commutator bar body 28. FIG. 4 illustrates the terminal connection formed by the fused commutator bar 24 and the metal core 32 bonded thereto upon completion of the fusing operation.

Further information concerning the fusing operation described above is contained in U.S. Pat. Nos. 3,045,103 and 4,504,724 mentioned above and also from U.S. Pat. No. 4,034,152. Those familiar with the art will recognize that different equipment may be used for fusing. As an example, the low-resistance electrode 40 could be replaced by a high-resistance electrode as explained in U.S. Pat. No. 4,034,152.

The fusion techniques described above are entirely satisfactory for many applications. One of the advantages is that the insulating coating 34 is removed essentially simultaneously with the fusing operation as a single step of machine operation. Therefore, it is a relatively simple matter to mount a wound armature assembly in a holding fixture of a fusing machine and, with each stroke of the high-resistance electrode 42 toward the armature shaft 18, a coil lead with an exposed metal core is directly fused to a commutator bar. The armature may be incrementally rotated to locate different commutator bars in position to be fused. Accordingly, the fusing of all the commutator bars and coil leads can be accomplished quite rapidly.

The prior art practices described above are on occasion carried out when fusing coil leads 30 having an insulating coating 32 with a relatively high temperature of evaporation. As an example, an insulating coating may have an evaporation temperature of approximately 600° F. in order to obtain a satisfactorily short operating cycle, the commutator tang 26 and the bar body 28 must, in said example, be heated to a temperature substantially in excess of 600° F. This temperature may be significantly higher than the softening temperature of the metal or metals forming the commutator bar 24 and the conductor wire core 32, in which event the wire and parts of the commutator may become highly plastic or partly molten. This may lead to defective armatures or to armatures which become defective after a relatively short period of use for various reasons. The terminal wire may melt to a point at which its cross section is so small that it cannot form a good electrical or mechanical connection; the commutator bar 24 may loosen from the underlying plastic commutator body 22; or parts of the commutator bar 24 may be annealed and, therefore, may interfere with subsequent commutator turning procedures or may lead to loosening of the commutator bar from the plastic body 22.

In accordance with this invention, a coil lead connection to a commutator bar 24 may reliably be obtained even if the heat of evaporation of the insulating coating 34 on the coil lead 30 is relatively high with respect to the softening temperature of the metal or metals from which the commutator bar 24 and the metal core 32 of the lead wire 30 are formed. The final connection may have the same appearance as the prior art connection shown in FIG. 4.

FIG. 5 shows the coil lead 30 engaged in the hook formed by the commutator tang 26 and the bar body 28 identically as in FIG. 3. In accordance with this invention, the insulating coating 34 is then removed by focusing an inductive heating beam, which may be either an ultrasonic beam or a laser beam, on the section of coil lead 30 hooked to the commutator bar 24 as is indicated by the ultrasonic or laser nozzle 50 in FIG. 5. Sufficient energy is supplied by the ultrasonic or laser beam to cause the wire core 32 to be inductively heated to a temperature that causes substantially complete evaporation of the insulating coating 34 in the localized area to which the beam is directed. Industrial lasers and industrial ultrasonic generators with focusing capabilities are commercially available. Since the details of such devices do not form part of the present invention, they are not further illustrated or described herein.

The removal of a section of the insulating coating 34 of the portion of a coil lead 30 engaged with one of the commutator bars 24 may be followed by successive removal of sections of the insulating coating 34 of the coil leads 30 engaging other commutator bars 24. This may be accomplished by holding the armature in a suitable fixture (not shown) and rotating the armature by automatic means (not shown) to present successive sections of the coil leads in the path of the focused beam. Such rotation may be carried out incrementally so that the rotation of the armature will momentarily cease when each successive coil lead is located in the path of the beam for removal of the insulating coating 34 therefrom. In such case, the beam generator may be intermittently energized or pulsed so as to be energized when a coil lead section is in the path of the beam. It is also possible to continuously rotate the armature with the beam generator energized so that as each coil lead is located at the focal point of the beam it is heated to cause removal of its insulated coating 34. In either case, the coil lead remains in the beam only so long as needed to cause substantially complete evaporation of the insulating coating 34 so that the use of excess energy is avoided and so that the metal core 32 of the coil lead 30 or adjacent portions of the commutator bar will not be unduly heated.

After all of the coil lead sections engaging the commutator bars have had portions of the insulation removed therefrom, the armature is located as shown in FIG. 6 relative to a fusing machine for the fusing operation to take place. The fusing operation is essentially the same as that described in relation to FIG. 3. The only differences is that the metal core 32 shown in FIG. 6 does not have an insulating core thereon so that it is in direct engagement with the commutator bar 24. Accordingly, if the insulating coating has a relatively high temperature of evaporation, a substantially higher fusing temperature, generated primarily by the heated electrode or electrodes, is required to practice the prior art process of FIG. 3 than is required to practice the two-step process of FIGS. 5 and 6 since, after the insulating coating 30 has been removed, a lower fusion temperature is needed to complete the fusing operation of FIG. 6. As a result, a final terminal connection that has the same appearance as the prior art connection shown in FIG. 4 is produced following the method of FIGS. 5 and 6.

The final terminal connection produced by the practice of the method of this invention, in many cases, will be better than prior connections because of the lower heat required to fuse the parts. Very small portions of the wire core 32 and the surface portions of the commutator bar engaged thereby may be melted during the step illustrated in FIG. 5. No part of the bar 24 need be melted to the extent that objectionable annealing occurs. Also, a portion of the gases created by the evaporation of the insulating coating 34 during the prior fusion process illustrated in FIG. 3 may become trapped in the final terminal connection and produce voids in the final terminal connection. This possibility is, of course, avoided in the practice of this invention because the insulating coating 34 is evaporated away before the final fusing operation.

As an option to the methods described above, wherein the sections of insulating coating 34 are removed from all of the coil leads 30 before any of the coil leads 30 are fused to the commutator bars 24, the ultrasonic or laser nozzle 50 may be so positioned relative to the fusing station that the insulating coating 34 may be removed from a section of the coil lead 30 when the wound armature assembly is located at the fusing station. The fusing operation for each commutator bar 24 may be accomplished immediately following the removal of the insulation 34 from the section of coil lead 30 engaged with that bar. The other coil leads and their associated commutator bars may be successively located within the path of the beam, the beam generator being energized to heat the coil lead to remove a section of insulating coating 34 therefrom, the beam generator then being deenergized, and the fusion operation described in relation to FIG. 6 then being accomplished.

The area of the insulated coil lead 30 from which its insulation is evaporated may be quite small. A highly concentrated inductive heating beam can be used so that much less energy may be needed to remove a section of the insulating coating 34 to expose the metal core 32 of the coil lead 30 than would be required to heat substantially the entire commuator bar to the insulating coating 34.

Although this invention has been shown for use with a coil lead to a commutator tang for an electric motor armature, it will be apparent that the invention is readily usable for connecting terminal wires for devices other than armatures, such, for example, as electric motor stators that have terminals with tangs. The invention may also be useful for connecting terminal wires to terminals having wire-receiving slots rather than tangs such as shown in the aforementioned U.S. Pat. No. 3,045,103. In every case, in accordance with this invention, the coil leads or other terminal wires are positioned in engagement with the parts of the terminals to which they are to be fused, these portions then being subjected to focused inductive energy to remove the insulating coatings thereon. The parts are thereafter fused using electrodes contacting the terminals, at least one of which is heated, all as described above.

Although the presently preferred embodiments of this invention have been described, it will be understood that within the purview of this invention various changes may be made within the scope of the appended claims.

I claim:

1. A method for terminating an insulated conductor wire to a terminal engaged by a stretch of said conductor wire, said method comprising the steps of:
    removing a section of the insulating coating from said stretch of said conductor wire by directing an energized source of electromagnetic energy to said stretch of conductor wire while it is engaged with said terminal thereby to inductively heat said stretch of conductor wire to the temperature at which said section of the insulating coating is evaporated;
    discontinuing the directing of energy to said stretch of conductor wire by said source; and
    fusing said terminal to said section of conductor wire and said commutator body by heating the terminal body and the wire with a fusing electrode sufficient to soften the same while simultaneously applying pressure to the terminal body and the conductor wire to fuse them together.

2. The method of claim 1 wherein the terminal comprises a commutator bar of a commutator of a fractional horsepower electric motor.

3. The method of claim 1 wherein said electromagnetic energy is in the form of a laser beam.

4. A method for terminating an insulated coil lead to a terminal having a body from which a lead-receiving tang extends, comprising the steps of:
    extending a stretch of said coil lead to said tang so that part of said coil lead engages said tang;
    removing a section of the insulating coating from said part of said coil lead by directing an energized source of electromagnetic energy to said part of said coil lead while it is engaged with said terminal thereby to inductively heat said part of said coil lead to the temperature at which said section of the insulating coating is substantially completely evaporated;
    discontinuing the directing of energy to said part of said coil lead by said source; and
    fusing said tang to said section of wire and said commutator body by heating the tang, the body, and the wire with a fusing electrode sufficient to soften the same while concurrently applying pressure to the tang to fuse the tang to the body and to the wire section.

5. The method of claim 4 wherein the terminal comprises a commutator bar of a commutator of a fractional horsepower electric motor.

6. The method of claim 4 wherein said electromagnetic energy is in the form of a laser beam.

7. A method for terminating an insulated conductor wire to a terminal engaged by a stretch of said conductor wire, said method comprising the steps of:
    removing a section of the insulating coating from said stretch of said conductor wire by directing an energized source of ultrasonic energy to said stretch of conductor wire while it is engaged with said terminal thereby to inductively heat said stretch of conductor wire to the temperature at which said section of the insulating coating is evaporated;
    discontinuing the directing of energy to said stretch of conductor wire by said source; and
    fusing said terminal to said section of conductor wire and said commutator body by heating the terminal body and the wire with a fusing electrode sufficient to soften the same while simultaneously applying pressure to the terminal body and the conductor wire to fuse them together.

8. A method for terminating an insulated coil lead to a terminal having a body from which a lead-receiving tang extends, comprising the steps of:
    extending a stretch of said coil lead to said tang so that part of said coil lead engages said tang;
    removing a section of the insulating coating from said part of said coil lead by directing an energized source of ultrasonic energy to said part of said coil lead while it is engaged with said terminal thereby to inductively heat said part of said coil lead to the temperature at which said section of the insulating coating is substantially completely evaporated;
    discontinuing the directing of energy to said part of said coil lead by said source; and
    fusing said tang to said section of wire and said commutator body by heating the tang, the body, and the wire with a fusing electrode sufficient to soften the same while concurrently applying pressure to the tang to fuse the tang to the body and to the wire section.